United States Patent [19]

Yasuda

[11] Patent Number: 5,230,016
[45] Date of Patent: Jul. 20, 1993

[54] HOLDER FOR PORTABLE ELECTRONIC EQUIPMENT

[75] Inventor: Hiroshi Yasuda, Kanagawa, Japan
[73] Assignee: Sony Corporation, Japan
[21] Appl. No.: 805,051
[22] Filed: Dec. 11, 1991
[30] Foreign Application Priority Data
  Dec. 28, 1990 [JP] Japan ................... 2-416337
[51] Int. Cl.⁵ ............... H04M 11/00; H04M 1/00; H04B 1/38
[52] U.S. Cl. ......................... 379/58; 379/426; 379/455; 455/90
[58] Field of Search ............... 379/58, 59, 455, 426, 379/454; 455/89, 90; 361/384; 165/80 B, 104.33

[56] References Cited

U.S. PATENT DOCUMENTS 4,850,006  7/1989  Sasaki et al. ................. 379/58
4,949,218  8/1990  Blanchard et al. ............. 361/384
5,029,236  7/1991  Yasuda et al. ................. 379/58

Primary Examiner—James L. Dwyer
Assistant Examiner—Jack Chiang
Attorney, Agent, or Firm—Ronald P. Kananen

[57] ABSTRACT

A holder for an electronic appliance includes a holding section 2 for holding a portable electronic appliance 101. A control circuit section 21 senses the temperature within the holding section 2 and, when the temperature is found to be higher than a predetermined temperature, a sirocco fan 16 is caused to be rotated for supplying outside air into the holding section 2 by a suction hole 17 and a vent hole 15 for cooling the electronic appliance 101. Since the electronic appliance 101 is cooled even under elevated environmental temperatures, the electronic appliance 101 may be protected against malfunction otherwise caused due to elevated temperatures.

12 Claims, 3 Drawing Sheets

HOLDER FOR PORTABLE ELECTRONIC EQUIPMENT

BACKGROUND OF THE INVENTION

This invention relates to a holder for electronic equipment, such as a radio telephone apparatus. More particularly, it relates to such holder which is adapted for sensing the temperature of the electronic equipment when held in its holding section and which is adapted for cooling the equipment when the sensed temperature exceeds a predetermined temperature.

Portable electronic appliances, such as portable radio telephone apparatus, are nowadays used extensively.

With this type of the electronic appliance, a driving unit driving an electronic circuit and other components making up the appliance is driven by a rechargeable secondary battery, such as Ni-Cd storage cell or a lithium ion storage cell. Thus the electronic appliance is provided with a recharging type power source section inclusive of the aforementioned secondary battery.

Meanwhile, the above mentioned portable electronic appliance provided with the recharging power source section may be used or left outdoors or in a vehicle compartment, so that it may be subjected to a wide range of environmental temperatures. The outer casing or the electronic circuit section constituting the outer casing or the electronic circuit section constituting the electronic appliance is at a temperature approximately equal to the temperature of a site at which the appliance is used or left.

Above all, in a vehicle compartment exposed to direct sunbeams, the outer casing and the electronic circuit section may reach an elevated temperature of approximately to 100° C. If the outer casing or the electronic circuit section should be subjected to such elevated temperatures, the risk is high that the appliance will be destructed due to failure or deterioration of the electronic circuit section or warping of the outer casing.

On the other hand, if the outer casing at such elevated temperatures is held by hand or brought into contact with the face of the user, the user may feel uncomfortable or may even be scalded in extreme cases.

If such electronic appliance includes the recharging type power source section inclusive of the secondary battery, failure or deterioration of the charging/discharging characteristics of the secondary battery may be produced due to the elevated temperatures of the recharging type power source section.

OBJECTS AND SUMMARY OF THE INVENTION

It is a principal object of the present invention to provide a holder for an electronic appliance whereby the failure of the electronic appliance or ill feeling or bodily injuries to the user may be prevented even when the electronic appliance is subjected to extremely high environmental temperatures.

It is another object of the present invention to provide a holder for an electronic appliance wherein, when the electronic appliance is held by a holding section of the holder, a cooling system is actuated for cooling the electronic appliance if the temperature of the electronic appliance exceeds a predetermined temperature.

It is a further object of the present invention to provide a holder for an electronic appliance whereby the charging/discharging characteristics of the secondary battery employed in the portable electronic appliance may be prevented from being deteriorated for assuring a longer service life of the secondary battery.

In accordance with the present invention, there is provided a holder for an electronic appliance having a holding section for holding the electronic appliance, comprising temperature sensing means for sensing the temperature around the electronic appliance held by said holding section, cooling means for cooling mainly the electronic appliance held by said holding section, and a control circuit for controlling the operation of said cooling means, said control circuit section actuating said cooling means based on the temperature sensed by said temperature sensing means.

Other objects and advantages of the present invention will become more apparent from the following description.

DETAILED DESCRIPTION OF THE PREFERRED EMBODIMENTS

Figure 1:
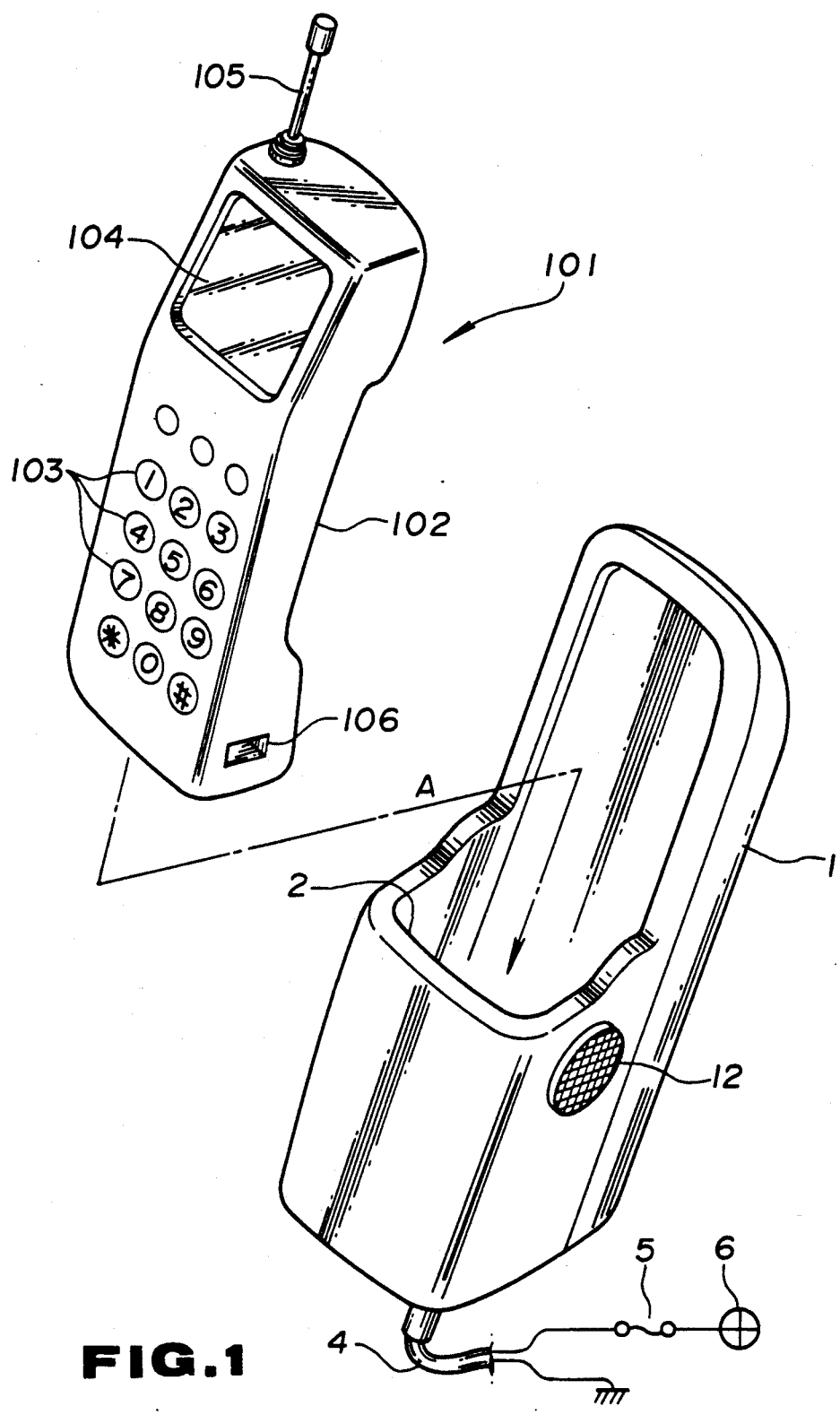
FIG. 1 is a perspective view showing the construction of a holder for an electronic appliance according to the present invention.

Referring to the drawings, an illustrative embodiment of the present invention will be explained in detail.

In the present embodiment, the holder for the electronic appliance of the present invention is adapted for holding a portable radio telephone apparatus 101.

The radio telephone apparatus 101 is adapted for exchanging information signals with a telephone exchange station. The apparatus 101 is provided with an outer casing 102 in the form of an elongated parallelepiped approximately 15 to 20 m long so that it may be gripped at a mid portion thereof so that both side portions thereof will be situated in the vicinity of the user's auricle and mouth. A mating notch 106 is provided in the vicinity of a lower edge on one lateral side of the outer casing 102.

A transmission circuit section for transmitting information signals as electrical waves to the telephone station in the form of electrical waves and a reception circuit for receiving electrical waves from the exchange station are accommodated within the outer casing 102 of the radio telephone apparatus 101. An antenna 105 by means of which the transmission circuit section and the reception circuit section transmit or receive the electrical waves is provided on the outer casing 102. A speaker unit, not shown, for converting the electrical signals produced by the reception circuit section receiving the electrical waves into voice and a microphone unit, not shown, for transmitting the electrical signals converted from the voice to the transmission circuit section, are also accommodated within the outer casing 102.

The radio telephone apparatus 101 is also provided with a plurality of pushbutton switches 103 for designating the called party by way of performing a so-called dialing operation, and a display unit 104 for making various displays.

Figure 2:
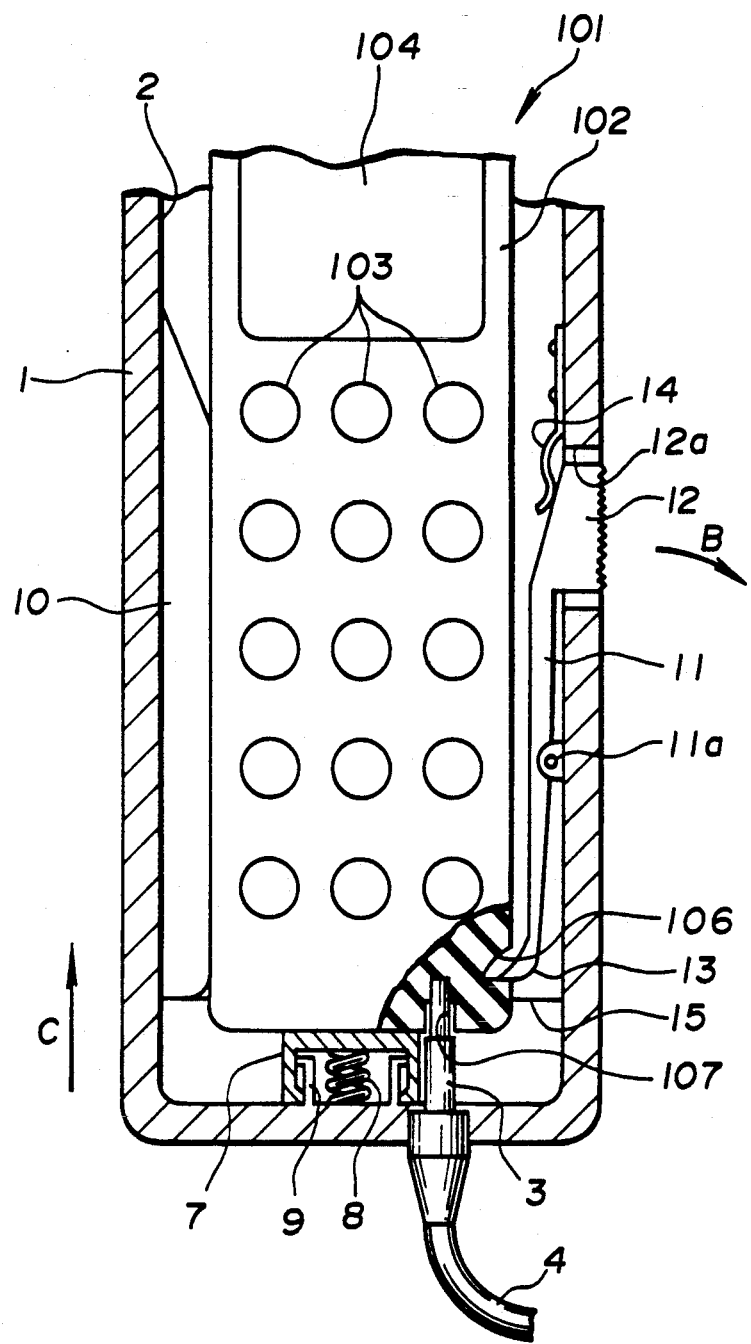
FIG. 2 is a front longitudinal cross-section showing the holder shown in FIG. 1, with portions thereof being broken away.

The radio telephone apparatus also includes an accumulator type power source section constituted by a rechargeable secondary battery such as Ni-Cd (nickel-cadmium) or lithium ion storage cell. The power source section is provided within the outer casing 102. The secondary battery of the power source section has its anode and cathode connected to the portions of the transmission and reception circuit sections connected to the power source and to the portions of the circuit sections maintained at the ground voltage, respectively, for supplying the power to the circuit sections. A recharging terminal 107, connected to the secondary battery, is provided on the lower surface of the outer casing 102, as shown in FIG. 2.

Figure 3:
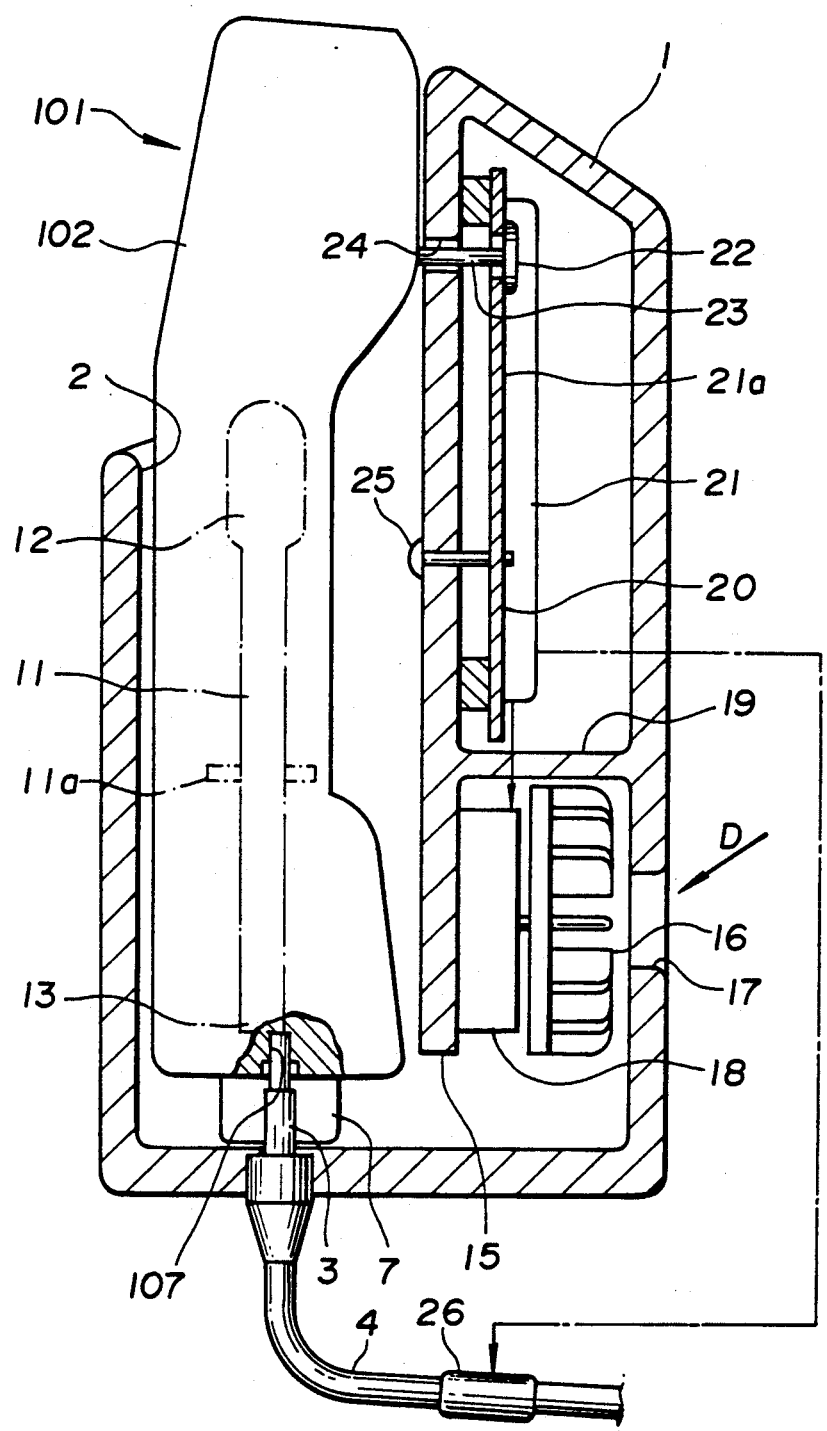
FIG. 3 is a side longitudinal cross-section showing the holder shown in FIGS. 1 and 2.

The holder of the present invention, adapted for holding the radio telephone apparatus, is provided with a housing 1, as shown in FIGS. 1 and 3. The housing 1 is in the form of an elongated parallelepiped for substantially mating with the outer casing of the radio telephone apparatus 101. This housing 1 is adapted for being attached to the wall surface of a dwelling or vehicle compartment at a rear surface thereof, and a holding section 2 for accommodating and holding the outer casing 102 of the radio telephone apparatus 101 is provided on the forward side of the housing 1. The holding section 2 is integral with the housing 1 and in the form of a pocket opened at the top. The holding section 2 is of a size such that substantially the lower half of the outer casing 102 of the radio telephone apparatus 101 may be accommodated therein when the apparatus 101 is introduced from above as indicated by an arrow A in FIG. 1.

A holding lever 11 is provided along an inner lateral surface of the holding section 2. The holding lever 11 has its one end directed towards the open upper side of the holding section 2 and its other end directed towards the bottom of the holding section 2. The holding lever 11 has its mid point rotatably supported on the inner wall surface of the holding section 2 by means of a pivot shaft 11a. The aforementioned one end of the lever 11 functions as a thrusting section 12 facing the outside by means of an opening 12a provided on a lateral surface of the holding section 2. Since the holding lever 11 may be rotated with the pivot shaft 11a as the center of rotation, the thrusting section 12 may be protruded out of or receded towards the inside of the opening 12a. The holding lever 11 is biased by a plate spring 14, provided within the holding section 2, in a direction in which the thrusting section 12 is protruded outward by means of the opening 12a, as shown by arrow B in FIG. 2. The plate spring 14 thrusts the side of the thrusting section 12 directed towards the inner side of the holding section 2.

The aforementioned other end of the holding lever 11 is formed as a retention section 13 bent slightly towards the inner side of the holding section 2. This retention section 13 is designed to be inserted at a tip end thereof into the mating hole 106 under the bias of the plate spring 14 when the outer casing 102 is inserted to a predetermined position within the holding section 2.

The other inner lateral surface of the holding section 2 has a guide rib 10 engaged with a mating groove, not shown, on the outer casing 102 of the radio telephone apparatus 101 for correctly guiding the outer casing 102. The outer casing 102 may be guided within the holding section 2 with respect to the holding lever 11 by the guide rib 10 as far as a position in which the retention section 13 may be engaged into the mating retention notch 106.

A pressing member 7 is provided on the bottom surface of the holding section 2. The pressing member 7 is supported by a supporting member 9 provided on the bottom of the holding section 2 so as to be moved towards and away from the bottom of the holding section 2 within a predetermined extent. The pressing member 7 is biased in a direction away from the bottom of the holding section 2 by a compression coil spring 8 provided between the pressing member 7 and the bottom of the holding section 2, as indicated by an arrow C in FIG. 2.

A power supply terminal 3, connected to a recharging device, not shown, for charging the rechargeable power source section of the radio telephone apparatus 101, is provided on the bottom of the holding section 2. This power supply terminal 3 is adapted to be connected to the recharging terminal 107 when the outer casing 102 of the radio telephone apparatus 101 is introduced into the holding section 2. The power source supply terminal 3 is connected to the ground and to an anode 6 of the recharging device or an external power source device, not shown, by means of a transmission cable 4. A fuse 5 may be provided between the power supply terminal 3 and the anode 6.

The recharging device is supplied with the current by means of an interior wire or a car-laden lead storage cell for supplying the recharging current to the secondary battery of the accumulator type power source section by means of the transmission cable 4 and the power supply terminal 3.

The interior of the housing 1 of the holder is divided into two vertically by a partition wall 19. An electronic circuit 21 constituting a control circuit section is accommodated above the partition wall 19. The electronic circuit 21 is formed on a printed circuit board 21a carried by the inner wall of the housing 1.

The electronic circuit 21 includes a microswitch 22 having its operating rod 23 protruded outwardly of the front surface of the housing 1 by means of a through-hole 24 formed in the front surface of the housing 1. When the outer casing 102 of the radio telephone apparatus 101 is introduced into the holding section 2, the operating rod 23 is thrust by the outer casing 102 for opening or closing the microswitch 22. The electronic circuit 21 has a temperature sensor 25 facing the interior of the holding section 2 from the forward side of the housing 1 for sensing the temperature inside the holding section 2. A current breaker 26 provided on the transmission cable 4 is connected to the electronic circuit 21.

Based on the switching state of the microswitch 22 and the temperature sensor 25, the electronic circuit 21 controls the current breaker 26 and an electric motor 18 which will be explained subsequently. The electronic circuit 21 is also provided with a power source section, not shown, for driving the electronic circuit and the electric motor 18. The power source section may be an external power source or constituted by a dry storage cell.

The electric motor 18 and a sirocco fan 16 constituting cooling means are accommodated below the partition wall 19 within the housing 1. The sirocco fan 16 is comprised of a disc-shaped base block and a plurality of fins provided for radially extending from the base block. The sirocco fan 16 has a mid portion of the base block thereof mounted on the output shaft of the electric motor 18. The motor 18 is adapted to be driven under control of the electronic circuit 21 and is mounted on the inner wall on the forward surface of the housing 1 so that its output shaft is extended towards the rear surface of the housing 1. The portion of the housing 1 accommodating the motor 18 and the sirocco fan 16 is kept in communication with the bottom surface side of the holding section 2. A suction hole 17 is provided in the rear surface of the housing 1 substantially in register with the sirocco fan 16. That is, when the sirocco fan 16 is driven by the electric motor 18, air is sucked from outside the housing 1 into the inside of the housing 1 by means of suction hole 17 as indicated by arrow D in FIG. 3. Air sucked by the sirocco fan 16 into the housing 1 is supplied into the holding section 2 by means of the vent hole 15.

With the above described holder for the electronic appliance according to the present invention, when the outer casing 102 of the radio telephone apparatus 101 is inserted into the holding section 2, the outer casing 102 is guided by the guide rib 10 towards its predetermined position. The outer casing 102 thrusts the retention section 13 by the lower end thereof for turning the lever 11 against the bias of the plate spring 14. When the outer casing 102 is inserted further towards the inside of the holding section 2, the lower end of the outer casing 102 thrusts the pressing member 7 for displacing the pressing member 7 towards the bottom of the holding section 2 against the bias of the compression spring 8.

When the mating retention hole 106 faces the tip end of the retention member 13, the retention member 13 is engaged with the mating retention hole 106 by the retention lever 11 being rotated under the bias of the plate spring 14. The retention member 13, once engaged with the mating retention hole 106, prevents the outer casing 102 from being moved upwards with respect to the holding section 2. At this time, the power source terminal 3 is connected to the recharging terminal 107. Thus the recharging current is supplied by the recharging device to the accumulator type power source section of the radio telephone apparatus 101. In this manner, the outer casing 102 of the radio telephone apparatus 101 is accommodated within the holding section 2.

When the state of insertion of the outer casing 102 of the radio telephone apparatus 101 is sensed by the switching state of the microswitch 22, and the temperature sensor 25 senses that the inside of the holding section 2 reaches a first predetermined temperature of the order of 50° C., the electronic circuit 21 actuates the motor 18 for driving the sirocco fan 16.

By the rotation of the sirocco fan 16, outside air is drawn into the holding section 2 for cooling the interior of the holding section 2. With the present holder for the electronic appliance, the motor 18 is driven only when the outer casing 102 of the radio telephone apparatus 101 is accommodated within the holding section 2 and the interior of the holding section 2 reaches a predetermined temperature, so that the power consumption for driving the motor 18 is diminished.

When it is sensed by the temperature sensor 25 that the temperature within the interior of the holding section 2 is not lowered even upon rotation of the sirocco fan 16, and that the temperature within the holding section 2 is increased further and reaches the level of a second predetermined temperature of the order of 90° C., the electronic circuit 21 controls the current breaker 26 for interrupting the supply of the charging current to the power supply terminal 3.

For taking out the outer casing 102 of the radio telephone apparatus 101 held in the holding section 2 of the present holder, the thrusting section 12 is thrust manually for turning the holding lever 14 against the bias of the plate spring 11. This releases retention of the mating hole 106 by the tip end of the retention section 13. The outer casing 102 may now be moved upwards under the bias of the compression coil spring 8. Such movement of the outer casing 102 under the bias of the compression coil spring 8 releases the connection between the power source terminal 3 and the recharging terminal 107. The outer casing 102 may now be taken out of the holding section 2.

It is noted that, with the present holder for the electronic appliance, the electronic circuit 21, adapted for controlling the recharging device for interrupting the supply of the electric current when the interior of the holding section 2 reaches an elevated temperature, may also be adapted for controlling the recharging device for interrupting the supply of the recharging current.

It is also noted that the present holder for the electronic appliance may be used not only for holding the radio telephone apparatus as in the above described embodiment, but also for holding various other electronic appliances.

What is claimed is:

1. A holder for an electronic appliance having a holding section for holding the electronic appliance, comprising temperature sensing means for sensing a temperature around the electronic appliance held by said holding section,
   cooling means for cooling the electronic appliance held by said holding section, and
   a control circuit for controlling an operation of said cooling means,
   said control circuit actuating said cooling means based on the temperature sensed by said temperature sensing means;
   wherein the operation of said control circuit provided in said holding section is controlled by a switch activated by the electronic appliance being introduced into and held by said holding section, and;
   wherein said cooling means includes a fan rotationally driven by an electric motor.

2. A holder as claimed in claim 1 wherein said holding section comprises a housing having a container section containing the electronic appliance and an opening for introducing and removing said electronic appliance.

3. A holder as claimed in claim 1 wherein a holding lever is provided for holding the electronic appliance, said holding lever being rotationally biased by a spring provided within said holding section and wherein the electronic appliance introduced into said holding section is pressed and supported by said holding lever.

4. A holder as claimed in claim 3 wherein one end of said holding lever is provided with a retention member engaged in a mating hole provided in the electronic appliance introduced into and held by the holding section, and wherein said retention member is engaged in said mating hole when said electronic appliance is inserted into said holding section.

5. A holder as claimed in claim 4 wherein a spring-biased pressing member is provided within said holding section, said pressing member being adapted for pressing the electronic appliance held by said holding section upwards towards said opening of said holding section when said holding lever is rotated against the bias of said spring for releasing the retention member out of said mating hole.

6. A holder as claimed in claim 1 wherein said electronic appliance held by said holding section is provided with an accumulator type power source section.

7. A holder as claimed in claim 6 wherein said holding section is provided with a power source terminal adapted to be connected to a recharging terminal used for recharging said accumulator type power source section provided in the electronic appliance held by said holding section.

8. A holder as claimed in claim 1 wherein said control circuit and said fan are accommodated in separate container sections in said holding section delimited by a partition wall.

9. A holder as claimed in claim 1 wherein said electronic appliance is a radio telephone apparatus.

10. A holder for holding and recharging a hand held electronic appliance, said holder comprising:
 a) a holding section including a closed bottomed enclosure with an open top for surrounding at least partially said appliance, said holding section being formed to releasably secure said appliance in a recharging position in the holder;
 b) means attached to said holding section for recharging said appliance in its recharging position;
 c) cooling means for cooling said holding section and said appliance when said appliance is in its recharging position;
 d) a control circuit separated from said holding section for operating said cooling means;
 e) temperature sensing means for sensing a temperature around said holding section and appliance; and
 f) switch means for actuating said control circuit when said appliance is secured in said holding section in its recharging position so that said control circuit actuates said cooling means at a first and second temperature; and wherein said cooling means comprises a fan which is actuated at said first temperature.

11. The holder of claim 10 wherein said cooling means further comprises a circuit breaker which is actuated at said second temperature, and wherein said second temperature is higher than said first temperature.

12. The holder of claim 10, wherein said appliance is a radiotelephone.

* * * * *